United States Patent [19]

Suzuki et al.

[11] 4,394,404
[45] Jul. 19, 1983

[54] METHOD FOR PRODUCING MAGNETIC RECORDING MEDIUM

[75] Inventors: Yoshihisa Suzuki; Takanoli Kaizuka; Yoshiaki Hanyu; Mituyoshi Otake; Yoichi Hidano, all of Yokohama, Japan

[73] Assignee: Hitachi, Ltd., Tokyo, Japan

[21] Appl. No.: 293,090

[22] Filed: Aug. 17, 1981

Related U.S. Application Data

[62] Division of Ser. No. 118,742, Feb. 5, 1980, Pat. No. 4,313,989.

[30] Foreign Application Priority Data

Feb. 9, 1979 [JP] Japan .................................. 54-13349

[51] Int. Cl.$^3$ ............................................ H01F 10/02
[52] U.S. Cl. ..................... 427/48; 427/54.1; 427/130; 427/131; 427/289
[58] Field of Search ....................... 427/54.1, 127–132, 427/48, 289

[56] References Cited

U.S. PATENT DOCUMENTS 4,260,466  4/1981  Shirahata et al. .................. 427/54.1

FOREIGN PATENT DOCUMENTS 54-24709  9/1979  Japan .

Primary Examiner—Bernard D. Pianalto
Attorney, Agent, or Firm—Antonelli, Terry & Wands

[57] ABSTRACT

A magnetic recording medium having a metamorphosed layer on the surface of the magnetic layer of conventional magnetic recording media, said metamorphosed layer being derived from some of a binder component included in the magnetic layer, can prevent the sticking trouble taking place between the magnetic recording medium and the magnetic head. Said metamorphosed layer can be formed by irradiation with ultraviolet rays in the course of the production of magnetic recording media at the step of coating a dispersion of magnetic particles on a flexible support or after the coating step. Said metamorphosed layer can also be formed on the surface of once produced magnetic recording media irrespective of having caused the sticking trouble by irradiation with ultraviolet rays. Suitable apparatuses for producing such improved magnetic recording media are also provided.

13 Claims, 15 Drawing Figures

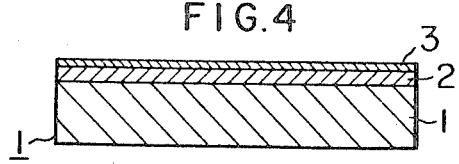
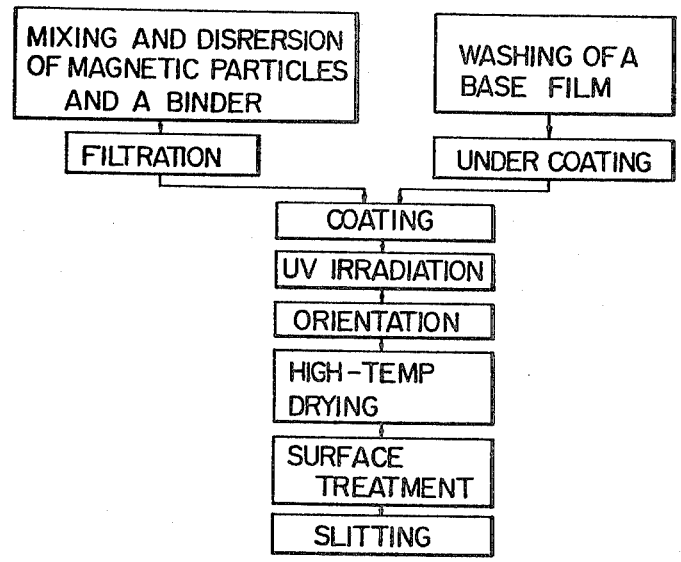
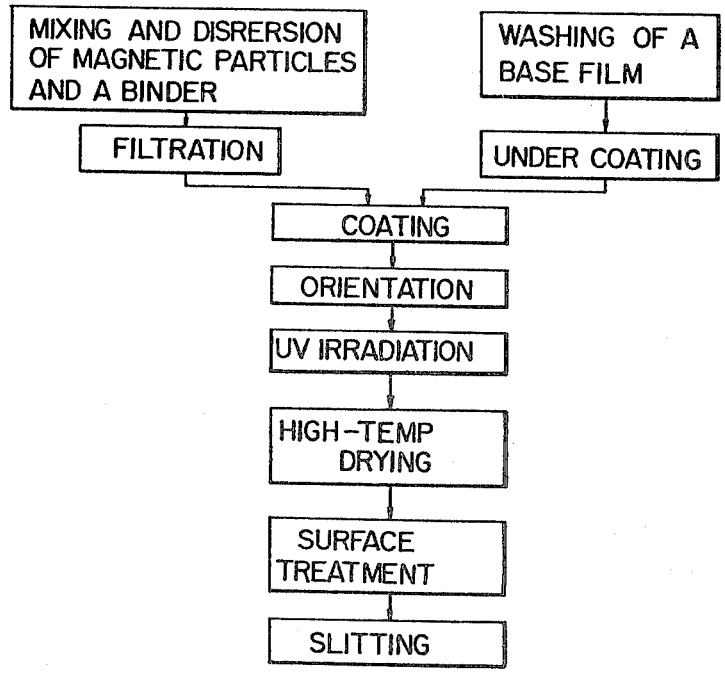

METHOD FOR PRODUCING MAGNETIC RECORDING MEDIUM

This is a division of application Ser. No. 118,742, filed Feb. 5, 1980 U.S. Pat. No. 4,313,989.

BACKGROUND OF THE INVENTION

1. Field of the Invention

This invention relates to a magnetic recording medium having a metamorphosed layer on the magnetic layer to prevent emergence of sticky material from the magnetic layer, a process for producing the same, a method for treating the surface of a magnetic recording medium so as to prevent sticking trouble between a magnetic head and the magnetic recording medium, and an apparatus for conducting such a treatment.

2. Description of the Prior Art

Magnetic tapes used as magnetic recording medium in magnetic tape recording equipments, magnetic tape recoders, and the like have structure as shown in the attached FIG. 1 wherein a magnetic layer 2 obtained by dispersing magnetic particles in a binder is adhered to a base film 1 such as polyethylene terephthalate film. These magnetic tapes are usually produced by the steps as shown in FIG. 2. That is, magnetic particles are mixed with a binder, a solvent and other additives for dispersion and the resulting coating dispersion is filtered before coating with, for example, a roll coater. On the other hand, a base film previously washed is led to the roll coater and the coating dispersion is coated on the base film at a speed of, for example, about 6 m/min. After the coating step, a magnetic field is applied to the resulting coating, if necessary to the coating direction, to impart magnetic orientation (orientation step). Subsequently, the solvent is evaporated in a high-temperature drying step, e.g. at about 120° C. for 2 minutes. If it is necessary to smooth the surface of the resulting magnetic layer, the magnetic layer is subjected to a surface treatment step by using a calender roll conventionally used to smooth the surface. The resulting tape is slitted to a prescribed size and then subjected to testing and packaging steps not shown in FIG. 2 to give commercially available magnetic tapes.

When these conventional magnetic tapes thus produced are used practically in magnetic tape recording equipments, magnetic tape recorders, and the like, there often occurs sticking phenomenon of the magnetic tape on a magnetic head which reads on signals depending on travel and stoppage of the magnetic tape. That is, when the magnetic tape is stopped after travel of a certain distance and starts travel again after some intervals, there occasionally occurs a trouble of not moving the magnetic tape due to sticking of the magnetic tape to the magnetic head. Hereinafter such a trouble is referred to as sticking trouble.

Heretofore, there has been almost no systematic report on the sticking trouble except for an article "A Study of Frictional and Stick-Slip Behavor of Magnetic Recording Tapes" by S. H. Kalfayer, R. H. Silver and J. K. Hoffman—NASA Technical Report 32-1548 (published Apr. 1, 1972). But there is no description as to fundamental countermeasures for preventing the sticking trouble in said article and there is disclosed only an idea of keeping magnetic tapes at low temperatures for preventing the sticking trouble with some effect.

Contrary to such a poor countermeasure for preventing the sticking trouble, there is a great need for urgent development of a technique for preventing the sticking trouble taking the output and using amount of magnetic tapes into consideration. Magnetic tapes conventionally used have many chances of suffering the sticking trouble except for special kinds of magnetic tapes.

The present invention extensively studied to remove such a defect of magnetic tapes and found that no remarkable effects were obtained by a heating treatment wherein the temperature of the tape is raised, a treatment under high humidity, a radiation treatment, washing with chemicals, a treatment by irradiating light or infrared rays. When an isocyanate which is known as an urethane curing accelerator was used, considerable effect was obtained but there was also produced an undesirable side effect of extension of one-side of the magnetic tape; such a treatment cannot be used practically. Only a treatment with ultraviolet rays was effective and the present invention was accomplished.

SUMMARY OF THE INVENTION

It is an object of this invention to provide a magnetic recording medium which can prevent the sticking trouble. It is another object of this invention to provide a process for producing such a magnetic recording medium. It is a further object of this invention to provide a method for treating the surface of a magnetic recording medium so as to prevent the sticking trouble. It is a still further object of this invention to provide an apparatus for conducting such a treatment.

This invention provides a magnetic recording medium comprising a flexible support, a magnetic layer containing magnetic particles bonded by a binder and being adhered to the flexible support, and a metamorphosed layer which is derived from some of said binder and is formed on the surface of the magnetic layer.

This invention also provides a process for producing such a magnetic recording medium characterized by employing the step of irradiation of the magnetic layer with ultraviolet rays at the time of coating a dispersion of magnetic particles on a flexible support or any time after the coating in the conventional process for producing magnetic tapes.

This invention provides a method for treating the surface of a magnetic layer of a magnetic recording medium produced by the conventional process with irradiating the surface of the magnetic layer with ultraviolet rays so as to form the metamorphosed layer thereon.

Further, this invention provides an apparatus for forming the metamorphosed layer on the surface of the magnetic layer of a magnetic recording medium by irradiating ultraviolet rays through an ultraviolet transmitting filter.

BRIEF DESCRIPTION OF THE DRAWINGS

FIG. 4 is a cross-sectional view of the magnetic recording medium produced by the process of this invention.

FIGS. 5 to 9 are drawings which illustrate sequence of process steps according to the process of this invention.

DESCRIPTION OF THE PREFERRED EMBODIMENT

Figure 1:
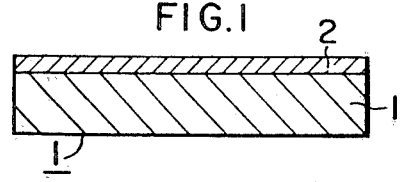
FIG. 1 is a cross-sectional view of a magnetic tape produced by the conventional process.

This invention is based on the finding of a cause and mechanism of the sticking trouble of magnetic recording media. When a deposit on the magnetic head at which the sticking trouble had been occurred was analyzed by conventional gel permeation chromatography (hereinafter referred to as "GPC method"), there was found a substance having a molecular weight of 10,000 to 100,000 converted to the styrene molecular weight. On the other hand, when a magnetic tape was treated with Fleon TMC (a trade name, manufactured by Mitsui Fluorochemical Co.) which can well extract the above-mentioned substance having a molecular weight of 10,000 to 100,000 converted to the styrene molecular weight and the extracted substance was analyzed by the GPC method, there was found that the above-mentioned substance was included in the magnetic tape in a large amount. These results can be explained that a fundamental cause of the sticking trouble is based on some portions of a binder component by which magnetic particles are adhered to a base film or flexible support retained unreacted while maintaining the molecular weight from 10,000 to 100,000 due to insufficient reaction. Particularly when urethane type binders are used for producing magnetic tapes, this tendency is remarkably observed.

On the other hand, it seems very difficult to proceed the reaction so as not to retain the unreacted binder at all, or to proceed the reaction to at least a degree causing no sticking trouble. Further, there is another problem of solving the sticking trouble of a gigantic amount of magnetic tapes widely used. In order to solve such problems, it is necessary to make clear the mechanism of the sticking trouble caused by the above-mentioned substance. After extensive study, it has been found that the presence of the substance which causes the sticking trouble in a magnetic tape does not lead to the sticking trouble immediately and that such a substance oozes out by the actions of outer factors such as pressure, tension, temperature rise, and the like under the normal use conditions of magnetic tapes and when the substance oozed out has a sticking activity, there takes place the sticking trouble.

This can be tested by a very simple method named as "press binding test" devised by the present inventors. The press binding test can be carried out as follows: two magnetic tapes are piled by contacting each magnetic layer and a pressure (e.g. 100 atm.) and a temperature (e.g. 50° C.) are applied thereto by using, e.g. a press and allowed to stand for a certain period of time (e.g. 5 hours) so as to make the two magnetic tapes adhere to each other. Sticking activity of the substance which causes the sticking trouble is judged by measuring strength required for peeling off the two magnetic tapes. After evaluating peeling strength of magnetic tapes which caused the sticking trouble and of those which did not cause the sticking trouble by the press binding test, it is revealed by experience that there is a fear of causing the sticking trouble if peeling strength is 2 kg or more, whereas there is almost no fear of causing the sticking trouble if peeling strength is 1 kg or less.

A further detailed study as to the deposit on the magnetic head after the sticking trouble caused by carrying out forward operating, stoppage, and reverse operating of a magnetic step revealed that the deposit was a polyurethane type polymer having a molecular weight of 10,000 to 100,000, molecular weight calibrated by styrene. Such a substance was not found on the magnetic head at which no sticking trouble was caused by a magnetic tape.

In the next place, various treatments were applied to polyurethane type materials having a molecular weight of the above-mentioned range so as not to cause the sticking trouble and found that irradiation with ultraviolet rays gave remarkably excellent effects.

Figure 3:
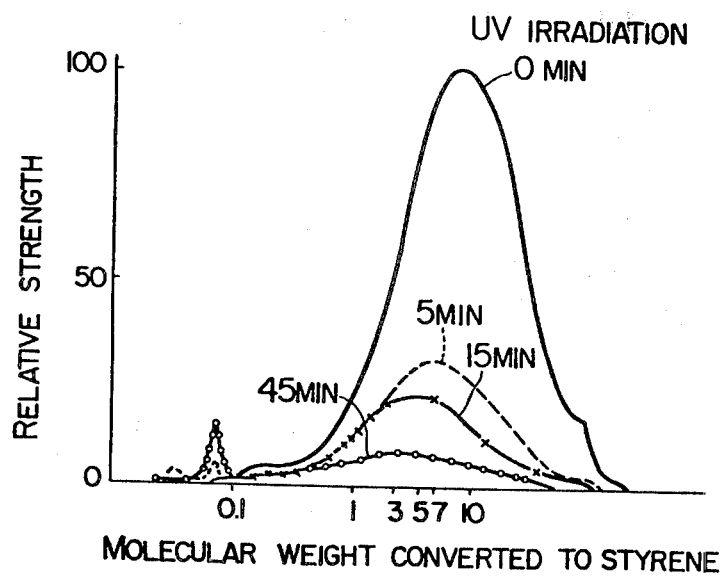
FIG. 3 is a graph showing effects of irradiation of ultraviolet rays.

In order to know effects of ultraviolet-rays irradiation, a sheet made of the same polyurethane type polymer, Paraprene 22S (a trade name, manufactured by Japan Polyurethane Ltd.), as deposited on the magnetic head having a molecular weight of 10,000 to 100,000, molecular weight colibrated by styrene was irradiated by ultraviolet rays and analyzed by using the GPC method. The results are as shown in FIG. 3. As the ultraviolet-rays source, a 1 kW mercury lamp was used at a distance of about 25 cm. In FIG. 3, the term "relative strength" means the output voltage of detector in G.P.C. device. As is clear from FIG. 3, the amount of the polymer having a molecular weight of 10,000 to 100,000 decreases with an increase of irradiation time of ultraviolet rays. These results show good agreement with the results obtained by the press binding test as shown in Table 1 below.

TABLE 1

| Irradiation time of UV rays | Peeling strength |
| --- | --- |
| 0 min | 2.1 kg |
| 2 | 0.8 |
| 7 | 0.3 |
| 15 | 0.0 |

Note
Press binding conditions: 100 atm., 50° C., 5 hours, sectional area 3 cm²;
Irradiation conditions: 1 kW mercury lamp, distance 25 cm.

The same excellent effects of ultraviolet-rays irradiation are also obtained in the case of using magnetic tapes commercially available and causing the sticking trouble. This invention is based on the above-mentioned technical principle.

The magnetic recording medium according to this invention comprises a flexible support (or base film), a magnetic layer adhered to the base film, and a metamorphosed layer. FIG. 4 is a cross-sectional view of the magnetic recording medium of this invention in which the numeral 1 denotes the magnetic recording medium (or the magnetic tape), the numeral 1 denotes the flexible support, the numeral 2 denotes the magnetic layer containing magnetic particles bonded by a binder, and the numeral 3 denotes the metamorphosed layer which is derived from some of the binder component.

As the flexible support, there can be used conventional ones such as paper, aluminum, copper and other thin metallic strips, cellophane, cellulose acetate, polyvinyl chloride, polyethylene terephthalate, polyimides, polyesters, etc.

The magnetic layer is made from a magnetic coating formulation comprising a magnetic pigment dispersed in a suitable polymer binder system such as a polyurethane type binder dissolved in organic solvents. As the magnetic pigment, there can be used generally acicular γ-ferric oxide and the like. The magnetic coating formulation may contain one or more conductive agents, dispersants, stabilizers, lubricants, and the like conventionally used.

The term "metamorphosed layer" means a layer which is derived from some of the binder component and becomes insoluble in organic solvents after the methamorphosis such as irradiation with ultraviolet rays.

According to this invention, since the methamorphosed layer is formed on the surface of the magnetic layer, there is no oozing out of the binder component from the magnetic layer during the use of the magnetic tape in magnetic tape recorders and the like equipments and therefore no sticking trouble takes place during the use. For example, conventional magnetic tapes bring about the sticking trouble at a running distance of about 70 m under the normal use conditions of pressure 10 g, tape speed 3 m/sec (usually from 1 m/sec to 5 m/sec), while the magnetic tapes of this invention do not bring about the sticking trouble over a running distance of 700 m (about 2400 feet).

Figure 2:
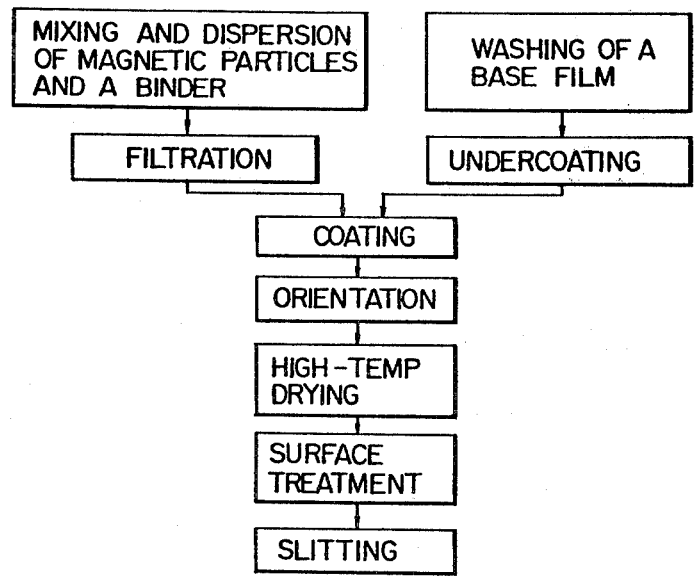
FIG. 2 is a drawing which illustrates sequence of process steps according to the conventional process for producing a magnetic tape.

The process for producing the magnetic recording medium of this invention is characterized by employing the step of irradiation of the magnetic layer with ultraviolet rays at the time of coating a dispersion of magnetic particles on the flexible support or at any time after the coating in the conventional process as shown in FIG. 2 which comprises the steps of mixing and dispersion—filtration—coating—orientation—high-temperature drying —surface treatment—slitting, and testing and packaging (not shown in the drawing).

FIG. 5 is one example of the process of this invention wherein the step of irradiation with ultraviolet rays is inserted between the steps of coating and orientation. In FIG. 5, the magnetic particle dispersion obtained by the step of mixing and dispersion of magnetic particles and a binder is passed to the step of filtration in order to remove dust particles mixed therein. In parallel, the base film which has been washed is passed to the step of undercoating so that the surface of the base film is easily wetted by the dispersion of magnetic particles and the binder. Then the step of coating is conducted by a conventional method. Thereafter, the magnetic particles dispersion is irradiated with ultraviolet rays.

Relationship between the magnetic recording medium and the apparatus factors for conducting ultraviolet-rays irradiation under such conditions is as follows. Since the amount of ultraviolet-rays irradiation energy K necessary for the unit area of the magnetic recording medium is not dependent on the moving speed of the magnetic recording medium in practical procedure and seems to be only dependent on the irradiation time (T), K can be represented by the following equation:

$$K = \text{(intensity of irradiation)} \times \text{(irradiation time)} \times \left(\frac{1}{\text{length of a light source}}\right) \quad (1)$$

When luminous intensity of the ultraviolet-rays source (e.g. input of a mercury lamp, kW) is expressed as W, distance between the light source and the magnetic recording medium L, and length of the light source practically used l', the intensity of irradiation can approximately be represented as follows:

(a) in the case of $L < l'$, $W/L$
(b) in the case of $L > l'$ $W/L^2$

Summarizing the above, ultraviolet-rays irradiation conditions can be determined by the following equations:

(i) in the case of the irradiation at a sufficiently smaller distance than the length of the light source (e.g. a mercury lamp) ($L < l'$), $$K \leq \frac{W \cdot T}{L \cdot l'}$$

wherein
W = input of the light source (kW)
T = irradiation time (sec)
L = distance between the light source and the magnetic recording medium (cm)
l' = length of the light source (cm), (ii) in the case of the irradiation at a sufficiently longer distance than the length of the light source ($L > l'$), $$K < \frac{W \cdot T}{L^2}$$

wherein W, T and L are as defined above. Preferable effects can be obtained when $K = 0.05-50$ W.sec/cm². In these cases, when the magnetic recording medium is moved in parallel to the direction of the length of the light source, the speed of the magnetic recording medium (v) can be represented as follows:

$$v = l'/T$$

wherein l' and T are as defined above.

More concretely, as the light source, a 1 kW mercury lamp having a central wavelength of 2500 Å can be used at a distance of 30 cm. The irradiation time is about 10 minutes. As the source of ultraviolet rays, there can be used conventionally used sources such as a mercury lamp, high pressure arc lamp, etc.

The thus treated base film is subjected to the conventional steps of orientation, wherein magnetic anisotropy is imparted to the coating of magnetic particles, high-temperature drying, surface treatment and slitting.

FIG. 6 is another example of the process of this invention wherein the step of irradiation with ultraviolet rays is inserted between the steps of orientation and high-temperature drying.

Figure 7:
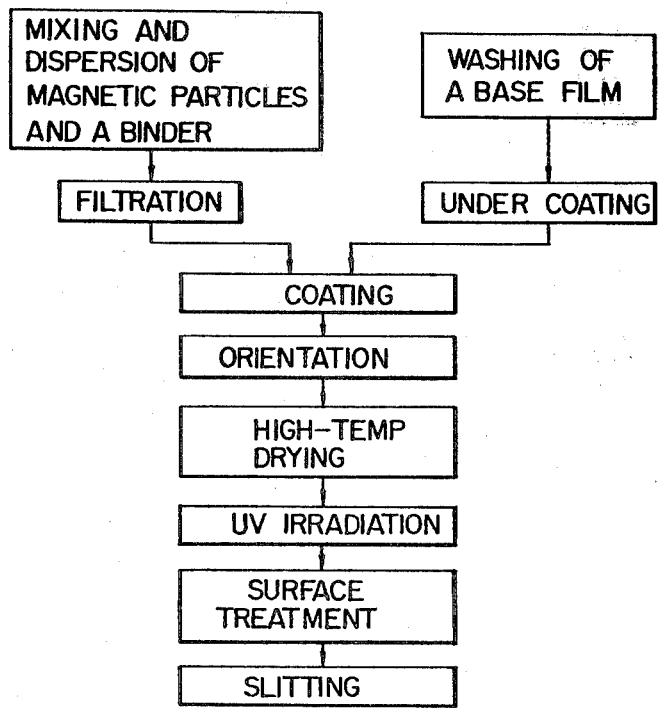

FIG. 7 is a still another example of the process of this invention wherein the step of irradiation with ultraviolet rays is inserted between the steps of high-temperature drying and surface treatment.

Figure 8:
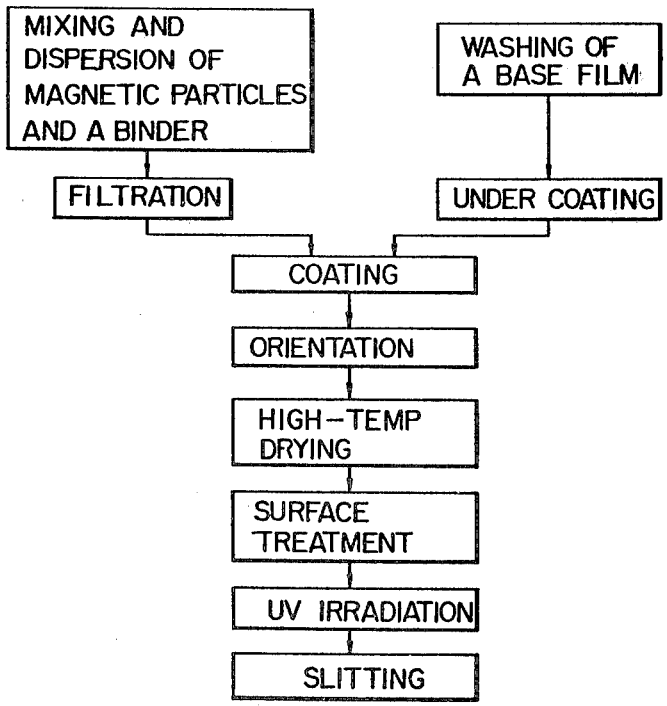

FIG. 8 is a further example of the process of this invention wherein the step of irradiation with ultraviolet rays is inserted between the steps of surface treatment and slitting.

Figure 9:
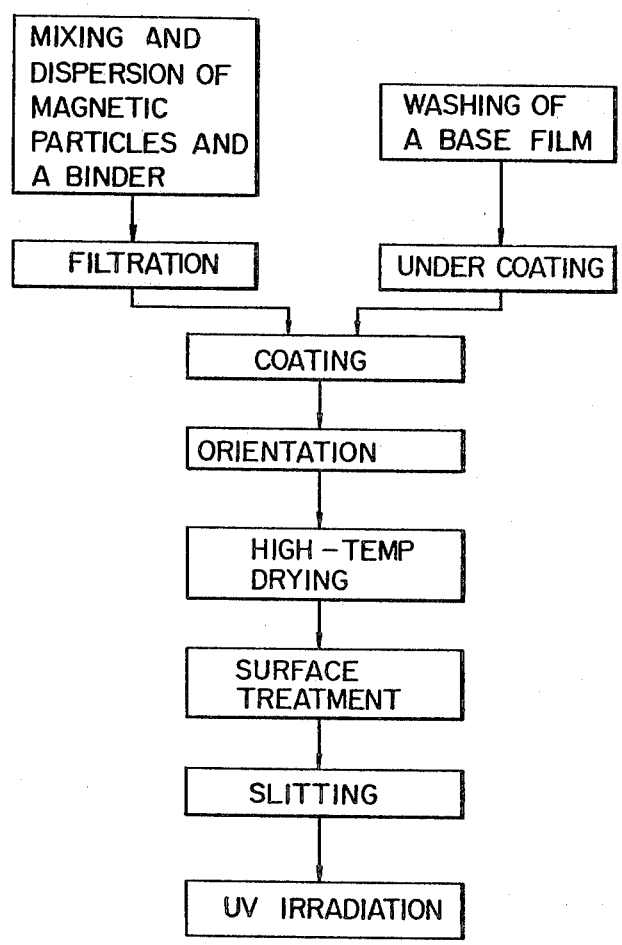

FIG. 9 is a still further example of the process of this invention wherein the step of irradiation with ultraviolet rays is effected after the step of slitting. The process of FIG. 9 is very useful and most important since this process can be applied to not only magnetic tapes newly produced but also those widely practically used. Further this process can also be applied to not only magnetic tapes which have caused the sticking trouble but also those to be the cause of the sticking trouble. Therefore, the process of FIG. 9 makes it possible to provide a method for recovering magnetic tapes which have caused the sticking trouble.

Thus, this invention also provides a method for treating the surface of a magnetic layer of a magnetic recording medium characterized by irradiating the surface of the magnetic layer with ultraviolet rays so as to form a metamorphosed layer on the magnetic layer, said metamorphosed layer being derived from some of the binder component included in the magnetic layer.

Figure 10:
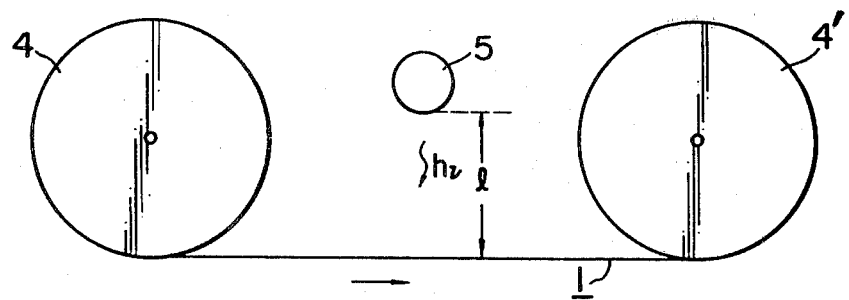
FIG. 10 illustrates in a diagrammatic manner one apparatus used for practicing this invention principally.

Principle of the treatment of the surface of magnetic tapes according to this invention is illustrated diagrammatically in FIG. 10, wherein either magnetic tapes newly produced or magnetic tapes in use or having caused the sticking trouble may be used effectively. In FIG. 10, the numeral 1 denotes a magnetic tape, the numeral 4 denotes a magnetic tape reel for feeding (hereinafter referred to as "feed reel"), the numeral 4' denotes a magnetic tape reel for take-up (hereinafter referred to as "take-up reel"), the numeral 5 denotes a mercury lamp, the symbol l means a distance between the mercury lamp and the magnetic tape, and an arrow mark indicates the direction of tape travel. As the feed reel 4 and the take-up reel 4', there may be used so-called jumbo rolls as they are. In such a case, the apparatus as shown in FIG. 10 can be applied to the process of FIG. 8.

Suitable ultraviolet-rays irradiation conditions are $K=0.05$ to 50 W.sec/cm$^2$, wherein K is defined in the equation (1). More concretely, when a 1 kW mercury lamp 5 having a central wavelength of 2500 Å is used, irradiation for a period of about 10 minutes at a distance (l) of 20 to 30 cm is sufficient for preventing the sticking trouble.

Figure 11:
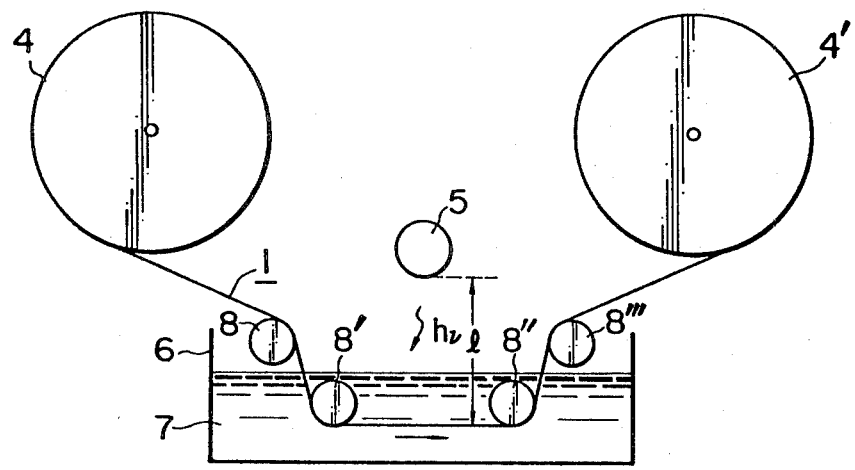
FIG. 11 illustrates in a diagrammatic manner one suitable apparatus for practicing this invention.

In order to increase efficiency of the ultraviolet-rays irradiation, an apparatus shown diagrammatically in FIG. 11 can practically be used. In FIG. 11, the numeral 6 denotes a water bath, the numeral 7 denotes water used as a water filter, the numerals 8, 8', 8'', and 8''' are guide rolls used for immersing the magnetic tape in water 7. Numerals 1, 4, 4' and 5 are as denoted in FIG. 10.

In order to increase efficiency of ultraviolet-rays irradiation, it is necessary to shorten the distance between the mercury lamp and the tape to be irradiated. But in such a case, it is also necessary to remove undesirable effects of rays simultaneously irradiated from the lamp belonging to the infrared region. This is because irradiation with the rays belonging to the infrared region generates heat in the magnetic tape, which results in causing mechanical strain in the magnetic tape and said mechanical strain will be retained in the tape as permanent strain after the treatment. The apparatus as shown in FIG. 11 is designed so as to solve such problems. That is, as shown in FIG. 11, the magnetic tape 1 from the feed reel 4 is immersed in water 7 in the water bath 6 at a suitable position via guide rolls 8 and 8'. The water 7 functions as a water filter so as to remove unnecessary heat rays belonging to the infrared wavelength components and to increase efficiency of the ultraviolet-rays irradiation. The magnetic tape 1 irradiated with ultraviolet rays (hν) via the water filter is passed through guide rolls 8'' and 8''' which are placed suitably in the water bath and is wound up by the take-up reel 4' to complete the step of ultraviolet-rays irradiation. In such a case, when a 1 kW mercury lamp 5 is used at a distance (l as a total) of 8.5 cm (a distance between the lamp and the water surface being 7 cm and a distance between the water surface and the tape being 1.5 cm), irradiation for a period of about 5 or 6 seconds gives sufficient effects for preventing the sticking trouble.

Figure 12A:
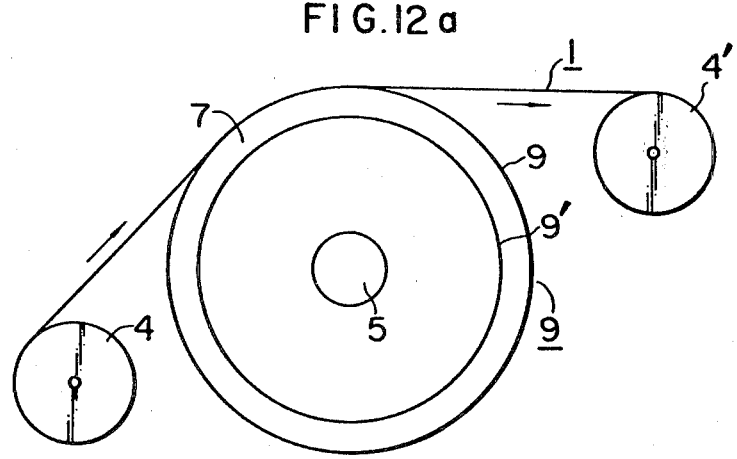
FIG. 12(a) is a side view and (b) is a top view of an apparatus suitable for practicing this invention.
Figure 12B:
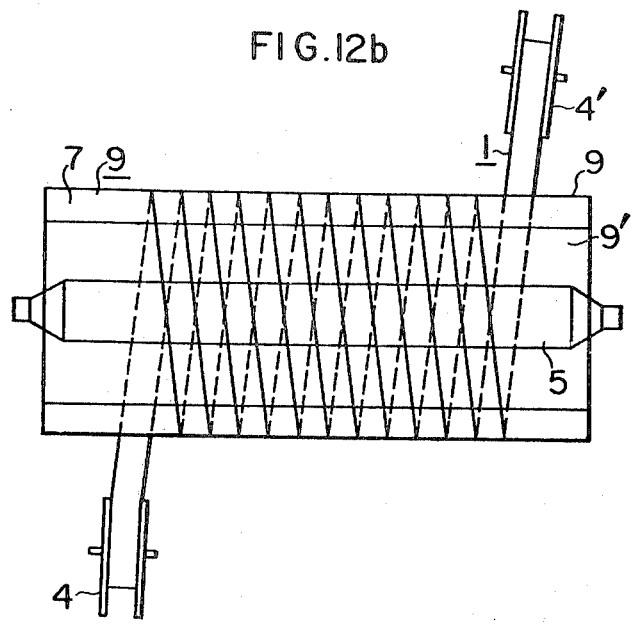
Figure 13:
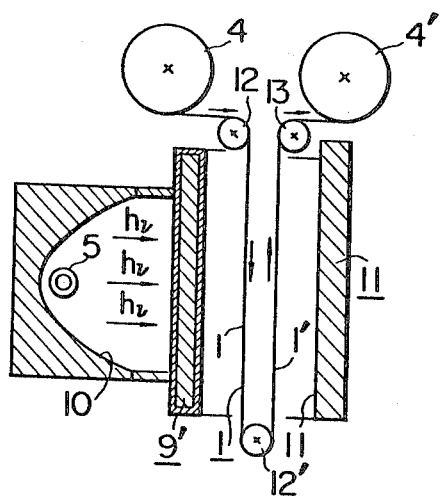
FIG. 13 illustrates in a diagrammatic manner one suitable apparatus for practicing this invention.
Figure 14:
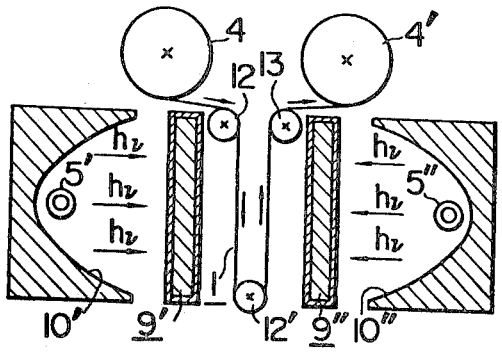
FIG. 14 illustrates in a diagrammatic manner one suitable apparatus for practicing this invention.

In practical irradiation of magnetic tapes with ultraviolet rays for preventing them from the sticking trouble, it is advisable to use more improved apparatuses as shown in FIGS. 12, 13 and 14, since the ultraviolet-rays irradiation step requires a long period of time. Such apparatuses for producing magnetic recording media having the metamorphosed layer on the surface of the magnetic layer as mentioned above comprise an ultraviolet generating means, e.g. a mercury lamp, etc., an ultraviolet transmitting filter means disposed between the ultraviolet generating means and a magnetic recording medium to be irradiated, and magnetic recording medium holding means comprising a feed reel and a take-up reel, the magnetic recording medium being passed between the two reels over no or a plurality of guide rolls therebetween.

A simplified example of such apparatuses is shown in FIG. 11, wherein the ultraviolet transmitting filter means is the water between the magnetic recording medium which is immersed in water and the surface of the water in the water bath and under the ultraviolet generating means.

Another example of such improved apparatuses is shown in FIGS. 12 (a) and (b), wherein the ultraviolet transmitting filter is a double walled cylinder between which walls is disposed a liquid which functions as filter, e.g. water, and the ultraviolet generating means is disposed axially lengthwise in the cylinder and around the cylinder is passed a magnetic recording medium separately fed and taken up by two reels.

FIG. 12 (a) is a side view of the apparatus wherein the numeral 1 denotes a magnetic tape, the numeral 4 denotes a feed reel, the numeral 4' denotes a take-up reel, the numeral 9 denotes water filter means in the form of a double walled cylinder between which walls 9 and 9', said walls being made of transparent quartz which can transmit ultraviolet rays, is disposed water 7 and said water filter means 9 is revolved around the ultraviolet generating means 5, i.e. a mercury lamp, by means of motor means not shown in the drawing. Necessary tension can be applied to the feed reel 4 and the take-up reel 4' by driving servo motors not shown in the drawing.

FIG. 12 (b) is a top view of the apparatus, wherein the magnetic tape is wound helically on the outer surface 9 of the water filter means 9 (inner diameter of the cylinder being 150 mm).

A further improved example of such apparatuses is shown in FIG. 13, wherein the ultraviolet generating equipment comprising an ultraviolet generating lamp and a concave mirror covering said lamp and reflecting ultraviolet rays generated is placed in front of a water filter means and a reflecting mirror is placed in parallel with the water filter means, and a magnetic recording medium is passed in an elongated loop over a plurality of guide rolls between the water filter means and the reflecting mirror, so that the magnetic layer on the magnetic recording medium is able to be irradiated with ultraviolet rays through the water filter means and reflected by the mirror.

In FIG. 13, ultraviolet rays generated by the ultraviolet generating means 5 (e.g. a mercury lamp) disposed at the focus of a concave mirror 10 having a parabolic plane are reflected by the concave mirror to give parallel beams which pass through a water filter means 9'. Ultravolet rays (hν) transmitted through the water filter means 9' are irradiated on the magnetic layer 1 on a magnetic tape 1 fed from a feed reel 4 to form a metamorphosed layer on the magnetic layer. Ultraviolet rays (hν) not directly irradiating the magnetic tape 1 are reflected by the reflecting surface 11 of the reflecting mirror 11 to irradiate the surface 1' of the magnetic tape so as to accomplish the desired object. By making the space surrounding the magnetic tape 1 to be irradiated with ultraviolet rays hν an enclosed structure within the limits of possibility, the internal space becomes an ultraviolet-rays bath and efficiency of the irradiation increases. The magnetic tape 1 irradiated with ultraviolet rays hν is taken up by the take-up reel 4' to complete the irradiation procedure.

FIG. 14 shows an apparatus improved in efficiency of irradiation of ultraviolet rays compared with that shown in FIG. 13. The improvement of the apparatus of FIG. 14 can be accomplished by replacing the reflecting mirror 11 shown in FIG. 13 by the ultraviolet generating equipment comprising an ultraviolet generating means 5" and a concave mirror 10" as shown in FIG. 14, so that the magnetic tape can be irradiated with ultraviolet rays directly immediately before being taken up by the take-up reel 4'. The rest of the structure of the apparatus of FIG. 14 is the same as that of FIG. 13.

The apparatuses shown in FIGS. 13 and 14 may further contain a plurality of pairs of rolls 12 and 12' so that the magnetic recording medium can be retained in the ultraviolet-rays bath for a long period of time for further exposure in order to attain the object of this invention. Needless to say, such structure can be included in the scope of this invention.

These apparatuses mentioned above can be used not only for newly producing improved magnetic tapes but also for re-producing magnetic tapes which have caused the sticking trouble during use.

The above-mentioned explanations are given mainly to magnetic tapes, but the technical idea of this invention can also be applied to various magnetic recording media such as magnetic disk. In the case of the magnetic disk, there often takes place a trouble of damaging the surface of magnetic disk by the contact of the magnetic disk and the magnetic head or by contact resistance which is generated by such a contact and is strengthened to sticky force (so-called sliding trouble). In such a case, since the cause of the trouble is stickness of magnetic recording media, the technique of this invention can also be applied thereto with the same effects.

The effects of this invention are particularly shown in the case of magnetic recording media in which a polyurethane type binder is contained as binder in the magnetic layer. Such polyurethane type binders are commercially available and have as a major component an ester type polyurethane produced by reacting, for example, adipic acid, butanediol and 4,4'-diphenylmethane diisocyanate.

As mentioned above, the magnetic recording media having the structure of this invention cause no sticking trouble. According to the process for producing magnetic recording media of this invention, magnetic recording media causing no sticking trouble can be produced easily and it is possible to prevent the sticking trouble from occurring. Further, according to the method of this invention for treating the surface of the magnetic layer of conventional magnetic recording media, not only newly produced magnetic recording media but also those used once or in use and causing the sticking trouble can be prevented from the sticking trouble. Still further, when the apparatuses according to this invention are used, there can be produced easily new magnetic recording media causing no sticking trouble and there can also be re-produced magnetic recording media, which have caused the sticking trouble, so as not to cause the sticking trouble. Therefore, the contribution of this invention to the technique of this field is very great.

What is claimed is:

1. In a process for producing a magnetic recording medium comprising the steps of dispersing magnetic particles in a binder and a solvent, coating the resulting magnetic particles dispersion on a flexible support, orienting the magnetic particles, drying the magnetic particles dispersion at a high temperature to prepare a magnetic layer, smoothing the surface of the magnetic layer and slitting the resulting flexible support, the improvement which comprises irradiating the magnetic particles dispersion or the magnetic layer with ultraviolet rays at the step of coating the magnetic particles dispersion or after the coating step to form a layer which prevents the oozing out of a substance from the magnetic layer which causes sticking trouble, said layer which prevents the oozing out of a substance from the magnetic layer being derived from some of said binder and being formed on the surface of the magnetic layer, whereby sticking trouble during use of said magnetic recording medium is substantially prevented.

2. A process according to claim 1, wherein ultraviolet rays are irradiated in the range of K=0.05 to 50 W.sec/cm², said K being defined by the following equation:

$$K = \text{(intensity of irradiation)} \times \text{(irradiation time)} \times \left(\frac{1}{\text{length of a light source}}\right)$$

3. A process according to claim 1, wherein the formation of the layer which prevents the oozing out of the substance from the magnetic layer which causes the sticking trouble is conducted at the step of coating or after the coating and before orientation.

4. A process according to claim 1, wherein the formation of the layer which prevents the oozing out of the substance from the magnetic layer which causes the sticking trouble is conducted at the step of orientation or after the orientation and before high-temperature drying.

5. A process according to claim 1, wherein the formation of the layer which prevents the oozing out of the substance from the magnetic layer which causes the sticking trouble is conducted at the step of high-temperature drying or after the high-temperature drying and before surface smoothing.

6. A process according to claim 1, wherein the formation of the layer which prevents the oozing out of the substance from the magnetic layer which causes the sticking trouble is conducted at the step of surface smoothing or after the surface smoothing and before slitting.

7. A process according to claim 1, wherein the formation of the layer which prevents the oozing out of the substance from the magnetic layer which causes the sticking trouble is conducted after the slitting.

8. A method for treating the surface of a magnetic layer of a magnetic recording medium which comprises irradiating the surface of the magnetic layer with ultraviolet rays so as to form a layer on the magnetic layer which prevents the oozing out of a substance from the magnetic layer which causes sticking trouble, said layer on the magnetic layer being derived from some of a binder component included in the magnetic layer, whereby sticking trouble during use of said magnetic recording medium is substantially prevented.

9. A process according to claim 1, wherein the binder is a polyurethane binder.

10. A process according to claim 1, wherein the binder is a polyurethane binder which has a molecular weight of 10,000 to 100,000, molecular weight calibrated by styrene.

11. A process according to claim 8, wherein the binder is polyurethane.

12. A process according to claim 8, wherein the binder component is polyurethane which has a molecular weight of 10,000 to 100,000, molecular weight calibrated by styrene.

13. A method for preventing sticking trouble in a magnetic recording medium produced by the steps of dispersing magnetic particles in a binder and a solvent, coating the resulting magnetic particles dispersion on a flexible support, orienting the magnetic particles, drying the magnetic particles dispersion at a high temperature to prepare a magnetic layer, smoothing the surface of the magnetic layer and slitting the resulting flexible support, which comprises:

irradiating the magnetic particles dispersion or the magnetic layer with ultraviolet rays at the step of coating the magnetic particles dispersion or after the coating step to form a layer which prevents the oozing out of a substance from the magnetic layer which causes sticking trouble, said layer which prevents the oozing out of a substance from the magnetic layer being derived from some of said binder and being formed on the surface of the magnetic layer.

* * * * *